US012771010B2

(12) United States Patent
Yoo et al.

(10) Patent No.: US 12,771,010 B2
(45) Date of Patent: Oct. 20, 2026

(54) ELECTRONIC DEVICE INCLUDING ANTENNAS

(71) Applicant: Samsung Electronics Co., Ltd., Suwon-si (KR)

(72) Inventors: Jangsun Yoo, Suwon-si (KR); Myeonggil Lee, Suwon-si (KR); Donguk Choi, Suwon-si (KR); Gun Lim, Suwon-si (KR); Jaebong Chun, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 288 days.

(21) Appl. No.: 18/122,767

(22) Filed: Mar. 17, 2023

(65) Prior Publication Data

US 2023/0223675 A1 Jul. 13, 2023

Related U.S. Application Data

(63) Continuation of application No. PCT/KR2022/016079, filed on Oct. 20, 2022.

(30) Foreign Application Priority Data

Oct. 26, 2021 (KR) ........................ 10-2021-0143195
Dec. 2, 2021 (KR) ........................ 10-2021-0170555

(51) Int. Cl.
*H01Q 1/22* (2006.01)
*H01Q 1/12* (2006.01)
(Continued)

(52) U.S. Cl.
CPC ............. *H01Q 1/2266* (2013.01); *H01Q 1/12* (2013.01); *H01Q 1/48* (2013.01); *H01Q 5/307* (2015.01); *H01Q 9/0407* (2013.01); *H01Q 21/08* (2013.01)

(58) Field of Classification Search
CPC .......... H01Q 1/12; H01Q 1/2266; H01Q 1/22; H01Q 1/243; H01Q 1/48; H01Q 5/307;
(Continued)

(56) References Cited

U.S. PATENT DOCUMENTS 10,490,879 B2 11/2019 Baek et al.
10,629,982 B2 4/2020 Kim et al.
(Continued)

FOREIGN PATENT DOCUMENTS

KR 20100041117 A 4/2010
KR 20160132649 A 11/2016
(Continued)

OTHER PUBLICATIONS

International Search Report for International Application No. PCT/KR2022/016079; Application Filing Date Oct. 20, 2022; Date of Mailing Jan. 27, 2023 (4 pages).

*Primary Examiner* — Dimary S Lopez Cruz
*Assistant Examiner* — Anna N Hamadyk
(74) *Attorney, Agent, or Firm* — CANTOR COLBURN LLP

(57) ABSTRACT

An electronic device may include a housing including a first cover, a second cover, and a slot positioned in a first side surface. A first antenna is positioned between a first inner surface and a second inner surface, facing the slot, and configured to operate in a first frequency band, and a second antenna is positioned between the first inner surface and the second inner surface, facing the first antenna, and configured to operate in a second frequency band different from the first frequency band.

14 Claims, 10 Drawing Sheets

(51) Int. Cl.

| | |
|---|---|
| ***H01Q 1/48*** | (2006.01) |
| ***H01Q 5/307*** | (2015.01) |
| ***H01Q 9/04*** | (2006.01) |
| ***H01Q 21/08*** | (2006.01) |

(58) Field of Classification Search

CPC ........ H01Q 5/30; H01Q 9/0407; H01Q 21/08; H01Q 21/28; H01Q 1/242; H01Q 13/10; H01Q 1/2258; H01Q 5/20; H01Q 15/14; H01Q 9/40; H04M 1/026

See application file for complete search history.

(56) References Cited

U.S. PATENT DOCUMENTS

| | | | | |
|---|---|---|---|---|
| 10,797,391 | B2 | 10/2020 | Lee et al. | |
| 2006/0092084 | A1 * | 5/2006 | Sakurai ................ | H01Q 19/005 343/702 |
| 2007/0060222 | A1 | 3/2007 | Finn et al. | |
| 2010/0090921 | A1 | 4/2010 | Kim et al. | |
| 2017/0373374 | A1 * | 12/2017 | Moon ...................... | H01Q 1/24 |
| 2020/0014089 | A1 * | 1/2020 | Hung ..................... | H01Q 5/307 |
| 2020/0106166 | A1 | 4/2020 | Wu et al. | |
| 2020/0203804 | A1 * | 6/2020 | Khripkov ............... | H01Q 1/243 |
| 2020/0329549 | A1 * | 10/2020 | Seo ...................... | H01Q 1/2283 |
| 2021/0126345 | A1 | 4/2021 | Yoo et al. | |
| 2021/0226318 | A1 * | 7/2021 | Chen ...................... | H01Q 1/243 |
| 2022/0006198 | A1 * | 1/2022 | Edwards .................. | H01Q 1/38 |

FOREIGN PATENT DOCUMENTS

| | | | |
|---|---|---|---|
| KR | 20170133952 | A | 12/2017 |
| KR | 20200058153 | A | 5/2020 |
| KR | 20200084617 | A | 7/2020 |
| KR | 20210032587 | A | 3/2021 |
| KR | 20210050352 | A | 5/2021 |

* cited by examiner

ELECTRONIC DEVICE INCLUDING ANTENNAS

CROSS-REFERENCE TO RELATED APPLICATIONS

This application is a continuation of International Application No. PCT/KR2022/016079, designating the United States, filed on Oct. 20, 2022, at the Korean Intellectual Property Receiving Office and claims priority to Korean Patent Application No. 10-2021-0143195, filed on Oct. 26, 2021, and Korean Patent Application No. 10-2021-0170555, filed on Dec. 2, 2021, at the Korean Intellectual Property Office, the disclosures of which are incorporated by reference herein in their entireties.

BACKGROUND

1. Field

The disclosure relates to an electronic device including multiple antennas.

2. Description of Related Art

The use of electronic devices having wireless communication functions, such as data communication (e.g., the Internet), has increased. Various technologies to utilize a next-generation network (e.g., 5th generation new radio (5G NR)) have been developed to provide a high-speed mobile communication function to a user.

SUMMARY

According to an embodiment, an electronic device may include a housing including a first cover including a first outer surface, a first inner surface opposite to the first outer surface, and a first side surface between the first outer surface and the first inner surface, a second cover including a second outer surface and a second inner surface opposite to the second outer surface and facing the first inner surface, and a slot positioned in the first side surface, a first antenna positioned between the first inner surface and the second inner surface, facing the slot, and configured to operate in a first frequency band, and a second antenna positioned between the first inner surface and the second inner surface, facing the first antenna, and configured to operate in a second frequency band different from the first frequency band.

According to an embodiment, an electronic device may include a housing including a first cover including a first outer surface, a first inner surface opposite to the first outer surface, and a first side surface between the first outer surface and the first inner surface, a second cover including a second outer surface and a second inner surface opposite to the second outer surface and facing the first inner surface, and a slot positioned in the first side surface, a first antenna positioned between the first inner surface and the second inner surface, facing the slot, and configured to operate in a first frequency band, a second antenna positioned between the first inner surface and the second inner surface, facing the first antenna, and configured to operate in a second frequency band different from the first frequency band, and a support structure positioned between the first inner surface and the second inner surface and configured to support the first antenna and/or the second antenna.

According to an embodiment, an electronic device may include a housing including a first cover including a first outer surface, a first inner surface opposite to the first outer surface, and a first side surface between the first outer surface and the first inner surface, a second cover including a second outer surface and a second inner surface opposite to the second outer surface and facing the first inner surface, and a slot positioned in the first side surface, a first antenna positioned between the first inner surface and the second inner surface, facing the slot, and configured to operate in a first frequency band, a second antenna positioned between the first inner surface and the second inner surface, facing the first antenna, and configured to operate in a second frequency band different from the first frequency band, and a support structure positioned between the first inner surface and the second inner surface, configured to support the first antenna and/or the second antenna, and including a reflector positioned between the first antenna and the slot.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
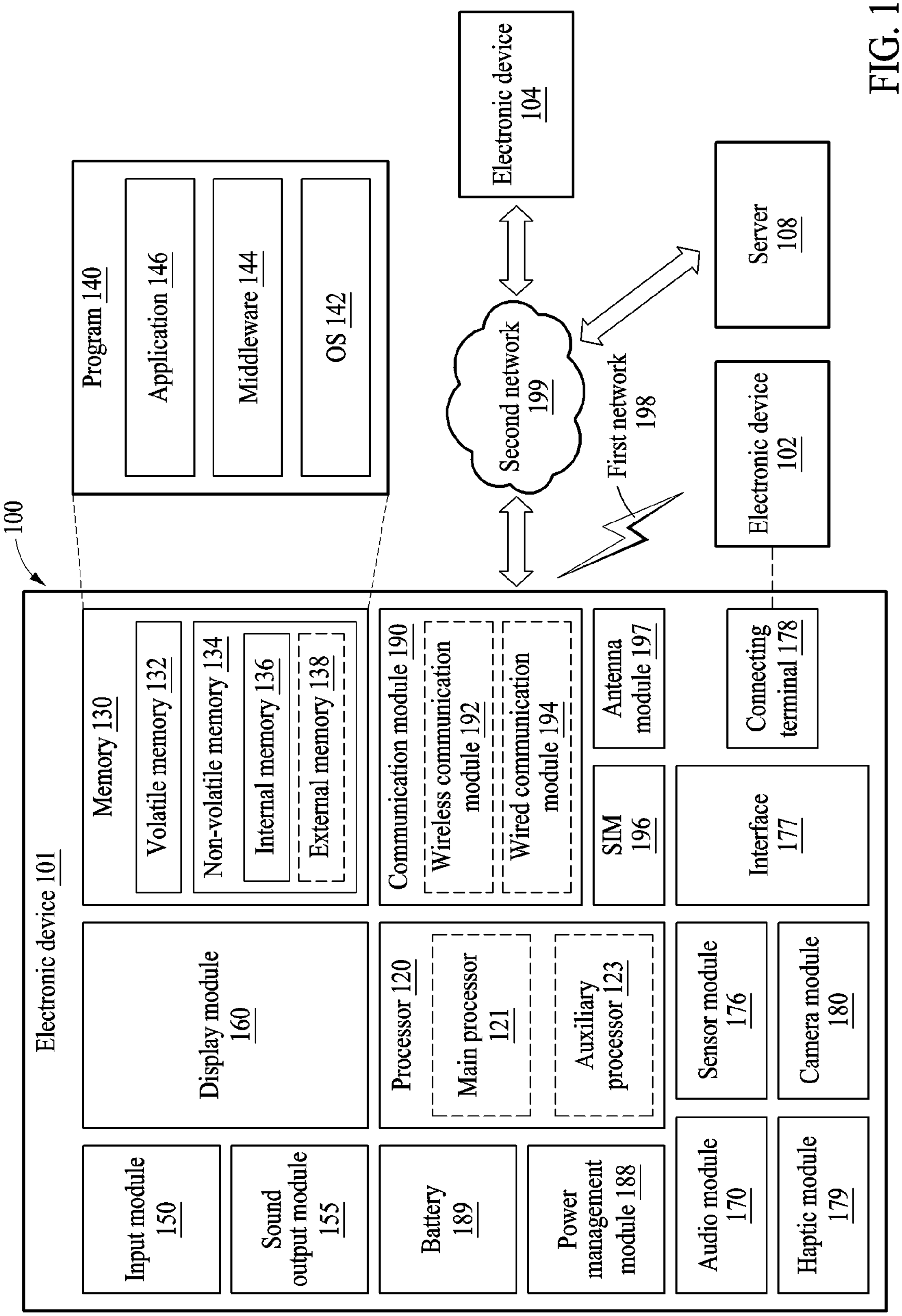
FIG. 1 is a block diagram illustrating an electronic device in a network environment according to an embodiment.

Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments, at least one (e.g., the connecting terminal 178) of the above components may be omitted from the electronic device 101, or one or more of other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but examples of which are not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment, the display device 160 may include a touch sensor adapted to sense a touch, or a pressure sensor adapted to measure an intensity of a force incurred by the touch.

The audio module 170 may convert a sound into an electric signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more of specified protocols to be used for the electronic device 101 to be coupled with the external electronic device (e.g., the electronic device 102) directly (e.g., wired) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more of lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more of communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local region network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide region network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type than the electronic device 101. According to an embodiment, all or some of operations to be executed by the electronic device 101 may be executed at one or more of the external electronic devices 102, 104, and/or server 108. For example, if the electronic device 101 needs to perform a function or a service automatically, or in response to a request from a user or another device, the electronic device 101, instead of, or in addition to, executing the function or the service, may request one or more of external electronic devices to perform at least part of the function or the service. The one or more of external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that an embodiment of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used in connection with an embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more of functions. For example, according to an embodiment, the module may be implemented in a form of an application-specific integrated circuit (ASIC).

An embodiment as set forth herein may be implemented as software (e.g., the program 140) including one or more of instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more of instructions stored in the storage medium, and execute it. This allows the machine to be operated to perform at least one function according to the at least one instruction invoked. The one or more of instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded or exchanged as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components may be omitted, or one or more of other components may be added. Alternatively or additionally, a plurality of components (e.g., modules or programs) may be integrated into a single component. In such a case, according to an embodiment, the integrated component may still perform one or more of functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more of other operations may be added.

Figure 2:
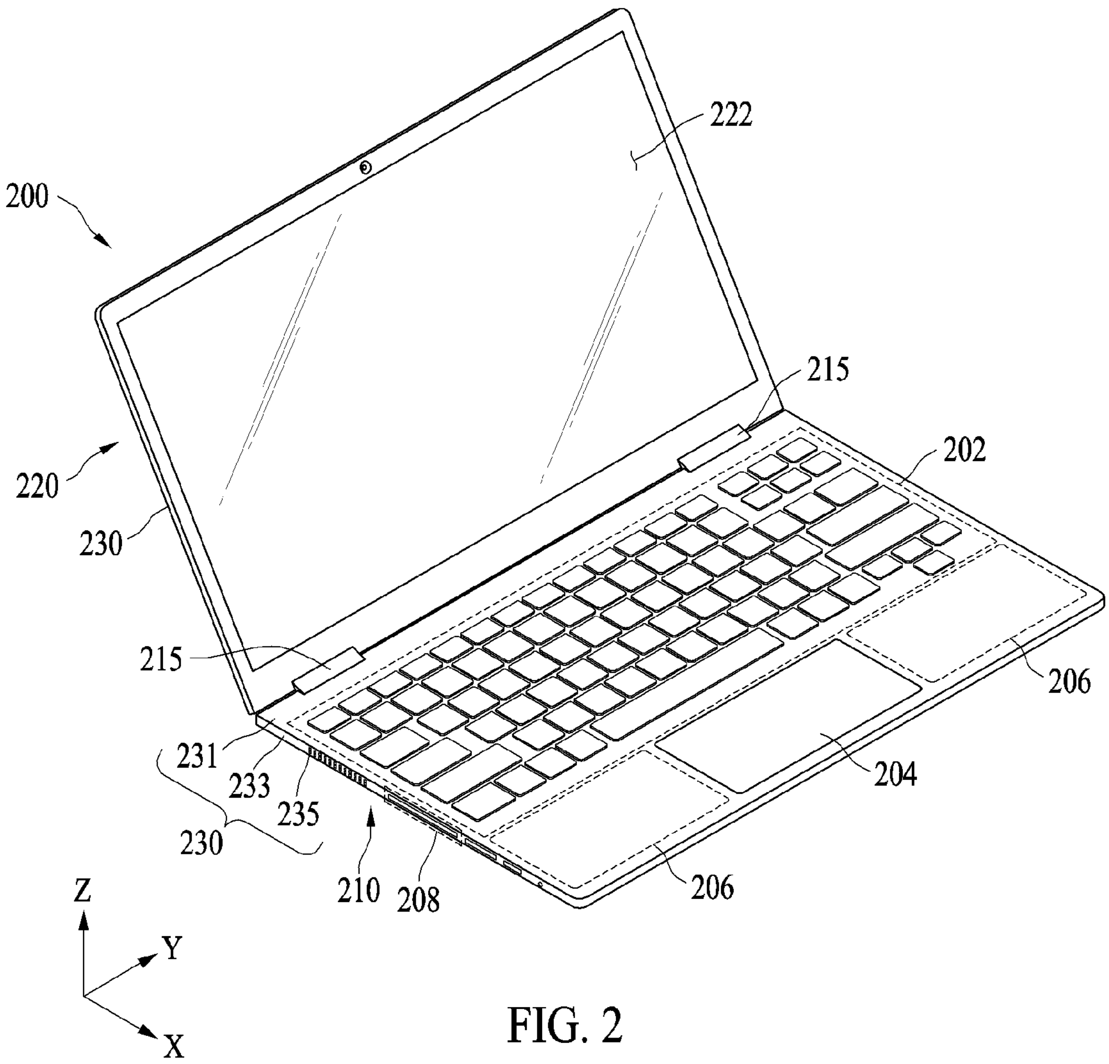
FIG. 2 is a perspective view illustrating an electronic device according to an embodiment.

Referring to FIG. 2, an electronic device 200 (e.g., the electronic device 101 of FIG. 1) may include a first housing 210, a connector 215, a display 220 (e.g., the display module 160 of FIG. 1), and a second housing 230. The electronic device 200 may be configured as, for example, a smartphone, a laptop computer (illustratively shown in FIG. 2), a tablet personal computer (PC), an e-book reader, a portable multimedia device, a portable medical device, a wearable device, a home appliance, or other type of electronic device as will be appreciated by those of skill in the art.

The first housing 210 may include a keyboard 202, a touchpad 204, a palm rest 206, and an antenna module 208. The keyboard 202 (e.g., the input device 150 of FIG. 1) may include a plurality of keys on an upper portion of the first housing 210. The keyboard 202 may receive numeric or character information that is input by a user that operates or uses the keyboard 202. The keyboard 202 may include a plurality of input keys and function keys for setting various functions of the electronic device 200. The function keys may include, without limitation, an arrow key, a volume key, and/or a shortcut key set to perform a designated function. The keyboard 202 may include one of a qwerty keypad, a 3*4 keypad, a 4*3 keypad, a touch key, and/or other similar types of input devices. The touchpad 204 may replace a function of a mouse. The touchpad 204 may input a command to select or execute an application displayed on the display 220 in response to user interaction with the touchpad 204. The palm rest 206 may be a pedestal or surface for reducing wrist fatigue of a user of the electronic device 200 when the user is using the keyboard 202 and/or touchpad 204. The antenna module 208 (e.g., the antenna module 197 of FIG. 1) may transmit or receive a signal or power to or from an external electronic device (e.g., the electronic device 102 and 104, and/or the server 108 of FIG. 1).

The connector 215 may foldably or unfoldably couple the first housing 210 to the display 220. The connector 215 may mechanically connect the first housing 210 and the display 220. The connector 215 may include, for example, a hinge member between the first housing 210 and the display 220. The connector 215 may electrically connect the first housing 210 and the display 220. The connector 215 may include, for example, a flexible printed circuit board (FPCB) between the first housing 210 and the display 220.

The display 220 may include a screen 222. The screen 222 may display information input by the user and information to be provided to the user using various menus and the keyboard 202 and/or touchpad 204 of the electronic device 200. The screen 222 may be formed of at least one of a liquid crystal display (LCD), an organic light-emitting diode (OLED), an active-matrix organic light-emitting diode (AMOLED), a flexible display, or a transparent display. The screen 222 may provide at least one of various screens, such as a home screen, a menu screen, a lock screen, a game screen, a webpage screen, a call screen, or a music or video playback screen according to use of the portable electronic device 200. In some embodiments, the screen 222 may be a touchscreen that is configured to receive user input that is directly input on or at the screen 222.

The second housing 230 may form an exterior of the first housing 210. The second housing 230 may also be applied to the palm rest 206 positioned in the first housing 210. The second housing 230 may protect at least one electronic component (e.g., the processor 120, the memory 130, the sensor module 176 of FIG. 1, and other electronic components) included in the first housing 210. The second housing 230 may include a first surface 231 covering the upper surface of the first housing 210, a second surface 233 covering a side surface of the first housing 210, and a third surface 235 covering a rear surface of the first housing 210. The second housing 230 may extend around and form an exterior of the display 220. The second housing 230 may protect at least one of various electronic components (e.g., the camera module 180, the sound output module 155 of FIG. 1, and other electronic components) and the screen 222 included in the display 220.

Referring to FIGS. 3A-3D, an electronic device 301 (e.g., similar to the electronic device 201) may include a housing 310 including a first cover 312 (e.g., an upper cover) and a second cover 314 (e.g., a lower cover). The first cover 312 may include a first outer surface 312A (e.g., a first upper outer surface), a first inner surface 312B (e.g., a first upper inner surface) opposite to the first outer surface 312A, a first side surface 312C (e.g., a first upper side surface) between the first outer surface 312A and the first inner surface 312B. In some embodiments, the first side surface 312C extends in a direction normal to each of the first outer surface 312A and the first inner surface 312B. The second cover 314 may include a second outer surface 314A (e.g., a second lower outer surface), a second inner surface 314B (e.g., a second lower inner surface) opposite to the second outer surface 314A, a second side surface 314C (e.g., a second lower side surface) between the second outer surface 314A and the second inner surface 314B. In some embodiments, the second side surface 314C extends in a direction normal to each of the second outer surface 314A and the second inner surface 314B. The first cover 312 and the second cover 314 may be coupled such that the first inner surface 312B and the second inner surface 314B face each other.

In an embodiment, the second outer surface 314A and the second side surface 314C may be seamlessly connected and integrally formed as one to be indistinguishable from each other. For example, the second outer surface 314A and the second side surface 314C may be substantially formed as one surface and may have at least a partially curved profile. In some embodiments, the second outer surface 314A and the second side surface 314C may be oriented to have different normal directions. In an embodiment, the second outer surface 314A and the second side surface 314C may be separated to be distinguishable from each other.

In an embodiment, the first cover 312 may include a first protrusion 312D formed on the first inner surface 312B and protruding from the first inner surface 312B toward the second inner surface 314B. In some embodiments, the first protrusion 312D may be positioned adjacent to the first side surface 312C or on the first side surface 312C. In some embodiments, the first protrusion 312D may be recessed or spaced apart from the first side surface 312C. In an embodiment, the second cover 314 may include a second protrusion 314D formed on the second inner surface 314B and protruding from the second inner surface 314B toward the first inner surface 312B. In some embodiments, the second protrusion 314D may be positioned adjacent to the second side surface 314C or on the second side surface 314C. In some embodiments, the second protrusion 314D may be recessed or spaced apart from the second side surface 314C. In an embodiment, the first cover 312 and the second cover 314 may be substantially formed of a metal material. In an embodiment, the first cover 312 and the second cover 314 may be substantially formed of a plastic material.

Figure 3A:
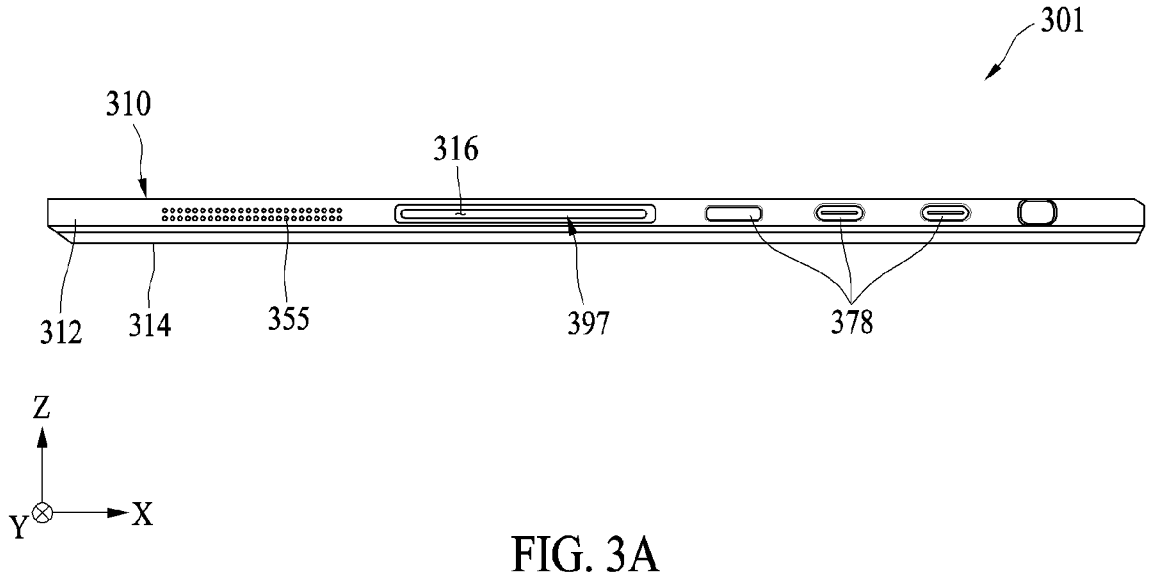
FIG. 3A is a side view illustrating an electronic device according to an embodiment.
Figure 3B:
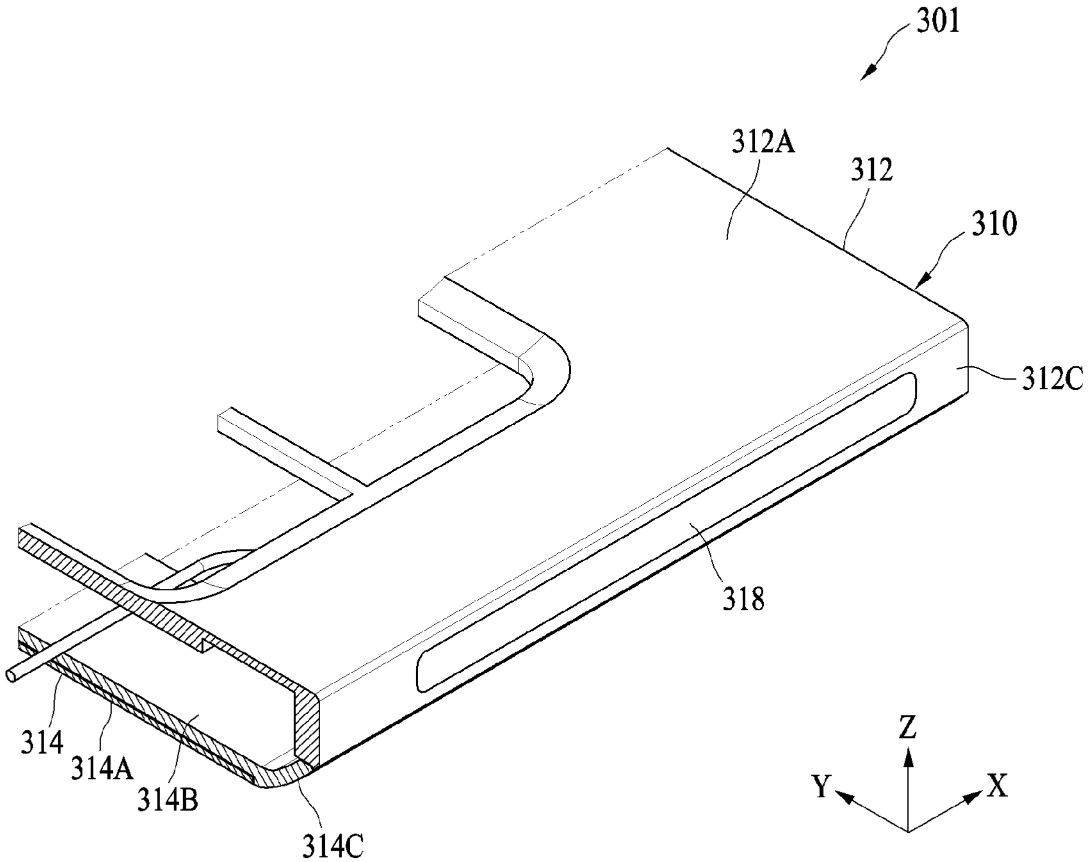
FIG. 3B is a perspective view illustrating a portion of a structure of the electronic device of FIG. 3A, according to an embodiment.
Figure 3C:
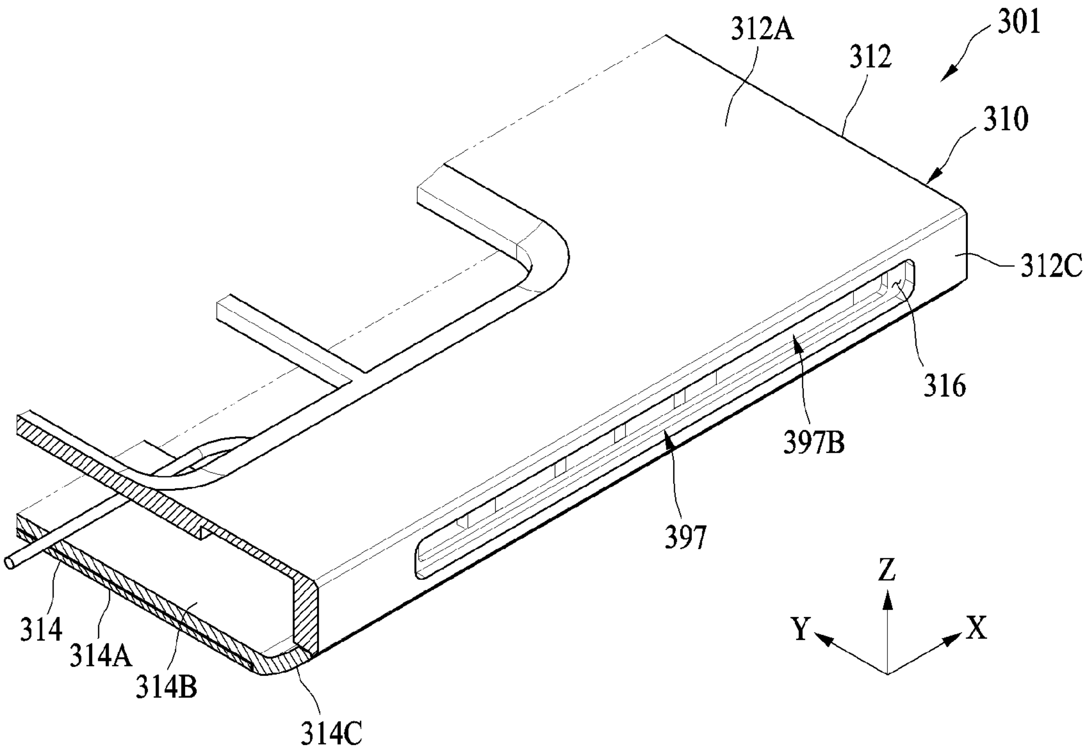
FIG. 3C is a perspective view illustrating components of the electronic device of FIG. 3A, according to an embodiment.
Figure 3D:
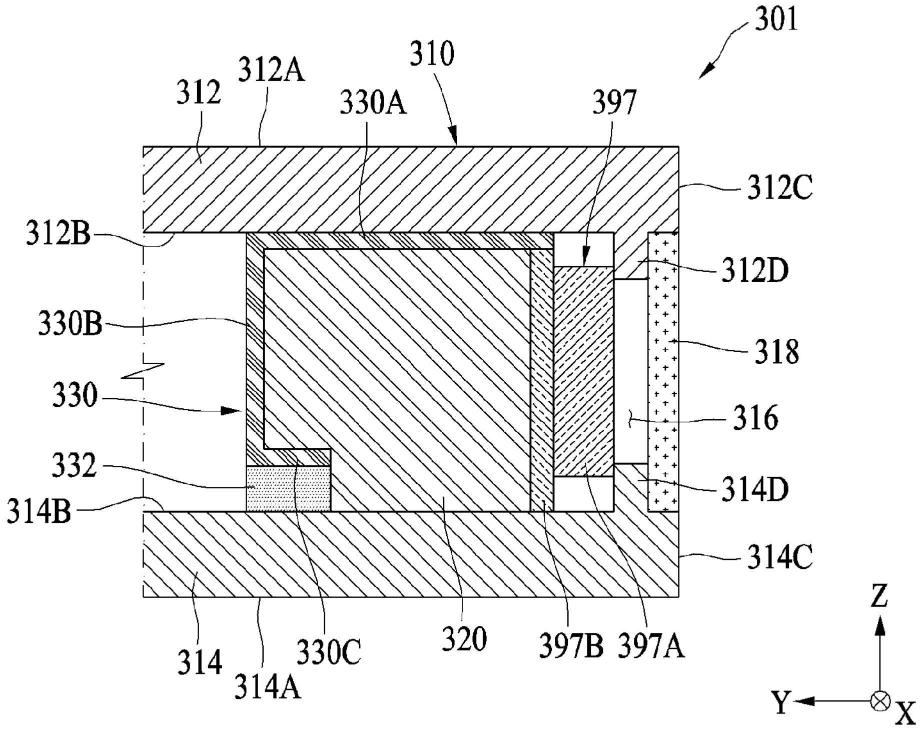
FIG. 3D is a view illustrating a cross-section of a portion of the electronic device of FIG. 3A, according to an embodiment.

In an embodiment, the housing 310 may include a slot 316 formed in the housing 310. For example, the slot 316 may be formed on, in, or by the first side surface 312C and/or the second side surface 314C. As example, the slot 316 may be formed between the first side surface 312C and the second side surface 314C. In some embodiments, the slot 316 may be defined by or between the first protrusion 312D and the second inner surface 314B. In some embodiments (e.g., as shown in FIG. 3D), the slot 316 may be defined by or between the first protrusion 312D and the second protrusion 314D. The slot 316 is an opening that, when not covered, provides an opening into an interior of the housing 310. Such opening (slot 316) may provide functional features, as described herein, such as providing an opening for communication therethrough, for resonance associated with an antenna, and/or for defining a pattern for a coupling feed.

In an embodiment, the housing 310 may include a slot cover 318 configured to cover or fit within the slot 316. For example, the slot cover 318 may visually and substantially block components (e.g., an antenna module 397) included in the electronic device 301 from being seen or accessed through the slot 316, and thereby improve aesthetics of appearance of the electronic device 301. The slot cover 318 may prevent, for example, foreign material from entering an inside of the electronic device 301 through the slot 316. The slot cover 318 may be formed of, for example and without limitation, a rubber material, glass (e.g., glass fiber), ceramic, a polymeric material, and/or combinations thereof. In an embodiment, a surface of the slot cover 318 may be on substantially the same plane as the first side surface 312C and/or the second side surface 314C. In some embodiments, the slot cover 318 may be positioned next to the first protrusion 312D and/or the second protrusion 314D and between the first inner surface 312B and/or the second inner surface 314B. In an embodiment, the slot cover 318 may form a continuous, smooth surface along a side of the electronic device 301, in combination with the first side surface 312C and the second side surface 314C.

The electronic device 301 may include a sound output module 355 (e.g., the sound output module 155 of FIG. 1) positioned in the housing 310. The sound output module 355 may include a speaker, for example. The sound output module 355 may include, for example, one or more speaker holes formed in the first cover 312 and/or the second cover 314.

The electronic device 301 may include one or more (e.g., three) of connecting terminals 378 (e.g., the connecting terminal 178 of FIG. 1) positioned in the housing 310. The connecting terminals 378 may include, for example, an HDMI connector, a USB connector, an SD card connector, an audio connector (e.g., a headphone connector), or other type of connector/port for connecting devices and/or components to the electronic device 301. The connecting terminals 378 may be formed in, for example, the first cover 312 and/or the second cover 314.

The electronic device 301 may include the antenna module 397 (e.g., the antenna module 197 of FIG. 1 and/or the antenna module 208 of FIG. 2) positioned in the housing 310. In an embodiment, and as shown in FIG. 3D, the antenna module 397 may include a plurality of antennas (e.g., first antenna 397A and second antenna 397B). In some embodiments, the plurality of antennas may include a first antenna 397A configured to operate in a first frequency band and a second antenna 397B configured to operate in a second frequency band (e.g., a legacy band) different from the first frequency band. In some embodiments, the first antenna 397A may be configured to operate in a mmWave band and the second antenna 397B may be configured to operate in a long-term evolution (LTE) band, a 5th generation (5G) Sub-6 communication band, a Bluetooth band, a global positioning system (GPS) band, and/or other frequency band(s), except for the mmWave band. In some embodiments, the second antenna 397B may include a PCB including a feed pattern and a ground.

In an embodiment, the first antenna 397A may be positioned between the first inner surface 312B and the second inner surface 314B and face the slot 316. The second antenna 397B may be positioned between the first inner surface 312B and the second inner surface 314B and face the first antenna 397A. In some embodiments, the first antenna 397A may be positioned closer to the side surfaces 312C, 314C of the housing 310 than the second antenna 397B, as illustratively shown in FIG. 3D. For example, the first antenna 397A may be positioned proximate the slot 316, and the second antenna 397B may be positioned proximate the first antenna 397A, with the first antenna 397A arranged between the second antenna 397B and the slot 316. In some embodiments, the first antenna 397A may be configured to radiate a radio wave through the slot 316 and the second antenna 397B may be configured to radiate a radio wave using the slot 316 as a radiation pattern. The slot 316 may secure resonance of the second antenna 397B and may be used as a pattern for a coupling feed.

In some embodiments, the first antenna 397A may directly face the slot 316 and the second antenna 397B may directly face the first antenna 397A. In some embodiments, the first antenna 397A and the second antenna 397B may be physically and/or structurally coupled, connected, or combined. In some embodiments, the first antenna 397A may be supported by the second antenna 397B and the first protrusion 312D and/or the second protrusion 314D. In some embodiments, the first antenna 397A and the second antenna 397B may at least partially overlap, in a direction between the first outer surface 312A and the second outer surface 314A, the first protrusion 312D and/or the second protrusion 314D.

In an embodiment, and as shown in FIG. 3D, the electronic device 301 may include an antenna carrier or a support structure 320 configured to support the antenna module 397. The support structure 320 may be positioned between the first inner surface 312B and the second inner surface 314B. In some embodiments, the support structure 320 and the second antenna 397B may be physically and/or structurally coupled, connected, or combined.

In an embodiment, the support structure 320 may be configured to directly support the second antenna 397B. In an embodiment, the support structure 320 may be configured to indirectly support the first antenna 397A. For example, the support structure 320 may support the second antenna 397B, and the second antenna 397B may support the first antenna 397A. In an embodiment, the support structure 320 may be configured to directly support the first antenna 397A. In an embodiment, the support structure 320 may be configured to indirectly support the second antenna 397B. For example, the support structure 320 may support the first antenna 397A, and the first antenna 397A may support the second antenna 397B.

In an embodiment, the electronic device 301 may include a ground sheet 330 configured to ground the second antenna 397B to the housing 310. In an embodiment, a first end of the ground sheet 330 may be electrically connected to a ground of the second antenna 397B, and a second end opposite to the first end of the ground sheet 330 may be electrically connected to the second cover 314.

In an embodiment, the ground sheet 330 may be positioned to at least partially enclose the support structure 320. For example, the ground sheet 330 may include a first sheet portion 330A connected to the second antenna 397B, positioned between the first inner surface 312B and a first surface (e.g., an upper surface of the support structure 320 as illustrated in FIG. 3D) of the support structure 320 and extending along the first inner surface 312B, a second sheet portion 330B connected to the first sheet portion 330A and positioned on a second surface (e.g., a left side surface of the support structure 320 as shown in FIG. 3D) of the support structure 320 and extending in a direction between the first inner surface 312B and the second inner surface 314B, and a third sheet portion 330C connected to the second sheet portion 330B and positioned between the second inner surface 314B and a third surface (e.g., a lower surface of the support structure 320 shown in FIG. 3D) of the support structure 320 and extending along the second inner surface 314B. As another example, the ground sheet 330 may include the first sheet portion 330A and the second sheet portion 330B without the third sheet portion 330C. As yet another example, the third sheet portion 330C may be directly connected to the second inner surface 314B.

In an embodiment, and as shown in FIG. 3D, the electronic device 301 may include a conductor 332 connecting the ground sheet 330 to the second cover 314. The conductor 332 may electrically connect, for example, the second sheet portion 330B and/or the third sheet portion 330C to the second inner surface 314B.

In some embodiments, the first cover 312 and the second cover 314 may be a single unitary body of a housing. For example, the first cover 312 may be referred to as a top portion of a housing, the second cover 314 may be referred to as a bottom portion of the housing, and the side surfaces 312C, 314C may be portions of a side portion, sidewall, or edge of the housing. In some embodiments, two separate covers may not be required. In such an embodiment, the side portion (formed of the side surfaces 312C, 314C) may include and/or define the slot 316 therein.

Figure 4A:
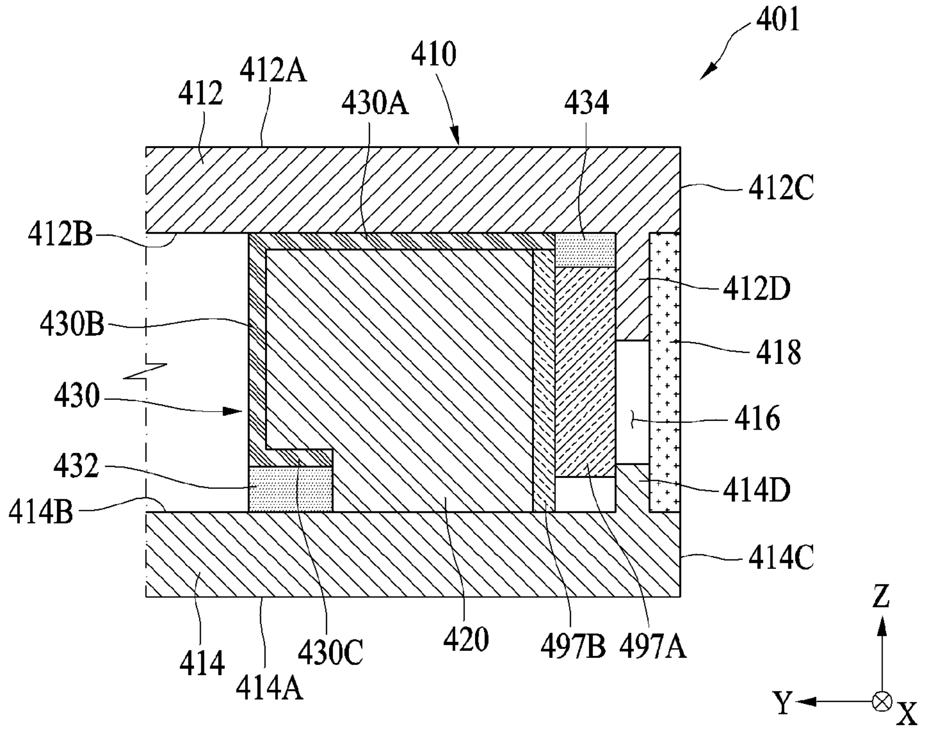
FIG. 4A is a view illustrating a cross-section of an electronic device according to an embodiment.
Figure 4B:
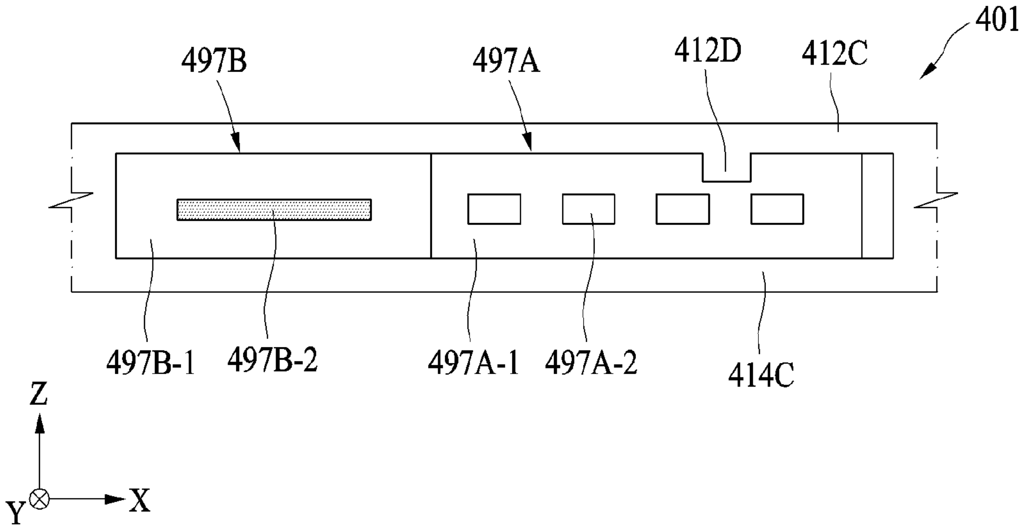
FIG. 4B is a view illustrating antennas viewed from an electronic device according to an embodiment.

Referring to FIGS. 4A and 4B, an electronic device 401 (e.g., similar to the electronic device 301 of FIGS. 3A-3D) may include a housing 410 (e.g., similar to the housing 310) including a first cover 412 (e.g., similar to the first cover 312), a second cover 414 (e.g., similar to the second cover 314), a slot 416 (e.g., similar to the slot 316), and a slot cover 418 (e.g., similar to the slot cover 318). The electronic device 401 may include a support structure 420 (e.g., similar to the support structure 320). The electronic device 401 may include a ground sheet 430 (e.g., similar to the ground sheet 330) including a first sheet portion 430A (e.g., similar to the first sheet portion 330A), a second sheet portion 430B (e.g., similar to the second sheet portion 330B), and a third sheet portion 430C (e.g., similar to the third sheet portion 330C). The electronic device 401 may include a first conductor 432 (e.g., similar to the conductor 332). The electronic device 401 may include a first antenna 497A (e.g., similar to the first antenna 397A) and a second antenna 497B (e.g., similar to the second antenna 397B).

The first cover 412 may include a first outer surface 412A (e.g., similar to the first outer surface 312A), a first inner surface 412B (e.g., similar to the first inner surface 312B), a first side surface 412C (e.g., similar to the first side surface 312C), and a first protrusion 412D (e.g., similar to the first protrusion 312D). The second cover 414 may include a second outer surface 414A (e.g., similar to the second outer surface 314A), a second inner surface 414B (e.g., similar to the second inner surface 314B), a second side surface 414C (e.g., similar to the second side surface 314C), and a second protrusion 414D (e.g., similar to the second protrusion 314D).

In an embodiment and as shown in FIG. 4B, the first antenna 497A may include a carrier portion 497A-1 and at least one radiation portion 497A-2 formed in the carrier portion 497A-1. The second antenna 497B may include a substrate portion 497B-1 and a pattern 497B-2 formed in the substrate portion 497B-1.

In an embodiment, the second antenna 497B may use the first protrusion 412D as a stub pattern. The second antenna 497B and the first protrusion 412D are arranged in a direction, for example which intersects (e.g. is orthogonal) with a direction between the first inner surface 412B and the second inner surface 414B. In some embodiments, the first protrusion 412D may be positioned not to substantially interfere with the at least one radiation portion 497A-2 of the first antenna module 497A. In an embodiment, the first protrusion 412D may be visually blocked by the slot cover 418 when the slot cover 418 is installed to the electronic device 401.

In an embodiment, and as shown in FIG. 4A, the electronic device 401 may include a second conductor 434 electrically connecting the first cover 412 to the second antenna 497B. The second conductor 434 may connect, for example, a ground of the second antenna 497B to the first inner surface 412B, the first side surface 412C, and/or the first protrusion 412D.

Figure 5A:
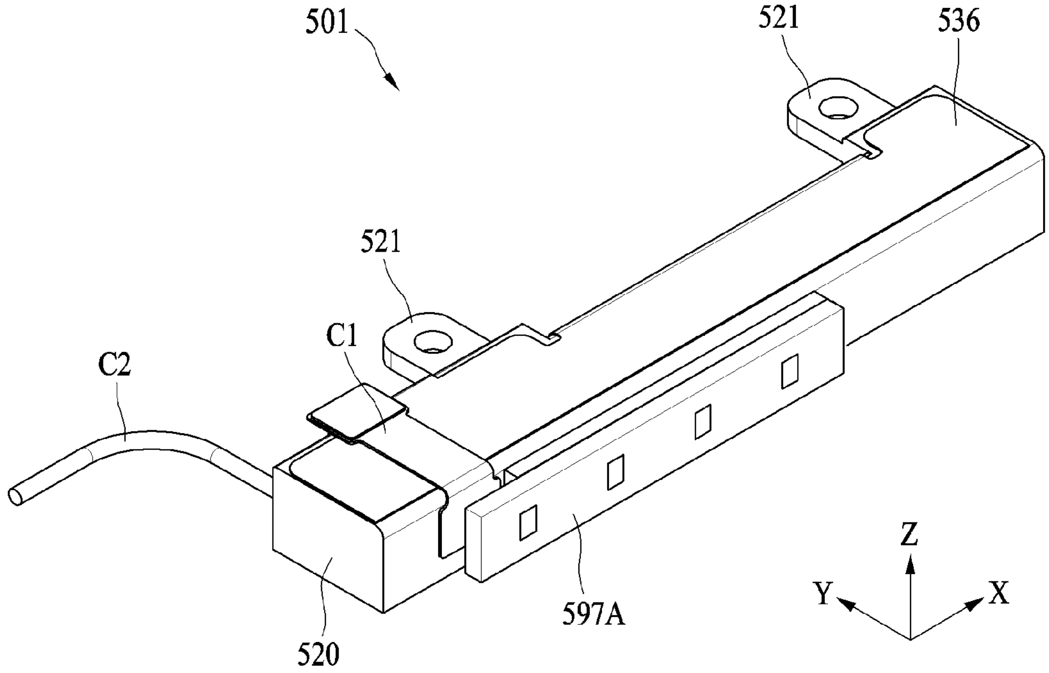
FIG. 5A is a perspective view illustrating antennas of an electronic device viewed in one direction according to an embodiment.
Figure 5B:
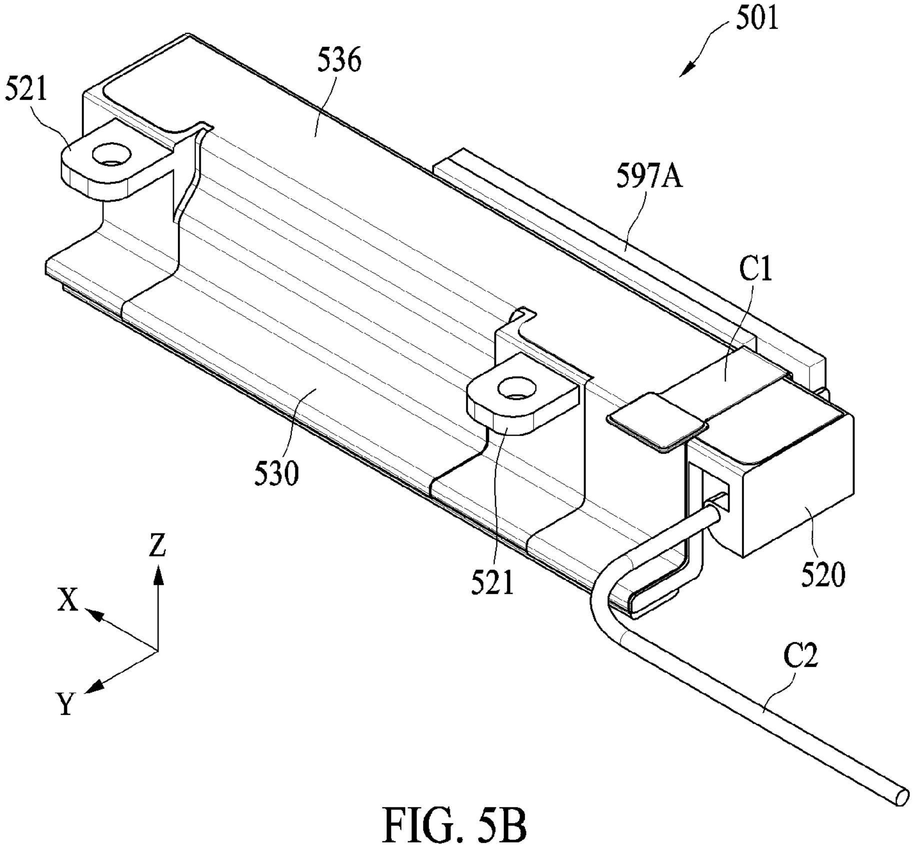
FIG. 5B is a perspective view illustrating antennas of the electronic device of FIG. 5A, viewed in another direction according to an embodiment.
Figure 5C:
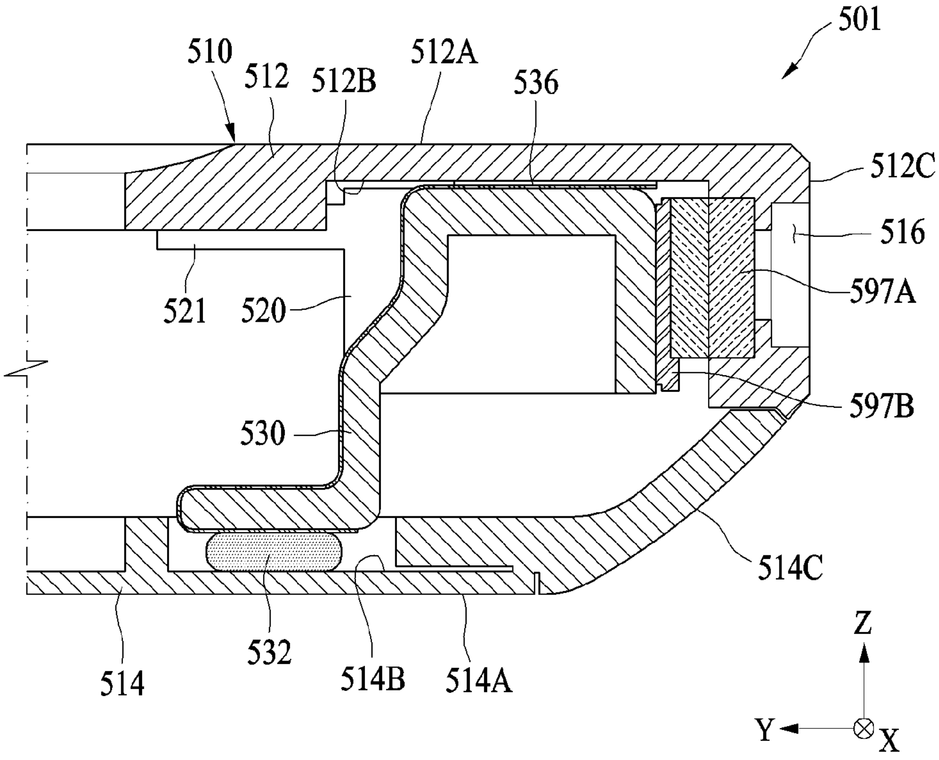
FIG. 5C is a view illustrating a cross-section of the electronic device of FIG. 5A, according to an embodiment.

Referring to FIGS. 5A-5C, an electronic device 501 (e.g., similar to the electronic device 301 of FIGS. 3A-3D and/or electronic device 401 of FIGS. 4A-4B) may include a housing 510 including a first cover 512, a second cover 514, and a slot 516. The first cover 512 may include a first outer surface 512A, a first inner surface 512B, and a first side surface 512C. The second cover 514 may include a second outer surface 514A, a second inner surface 514B, and a second side surface 514C. In the embodiment of FIG. 5C, the second side surface 514C illustrates a curved surface, as compared to the straight or flat surface of the above illustrated embodiments. It will be appreciated that the curvature of the second side surface 514C may be determined, at least in part, upon the configuration of the electronic device 501 to which it forms an external surface thereof.

The electronic device 501 may include a support structure 520 (e.g., similar to the support structure 320). The electronic device 501 may include a ground sheet 530 configured similar to that shown and described above. The electronic device 501 may include a first conductor 532 configured similar to that shown and described above. The electronic device 501 may include a first antenna 597A and a second antenna 597B, configured similar to that shown and described above. The electronic device 501 may include a first cable C1 (e.g., a flat ribbon cable) configured to connect the first antenna 597A to a communication module (e.g., the communication module 190 of FIG. 1), and a second cable C2 (e.g., a coaxial cable) configured to connect the second antenna 597B to the communication module.

In an embodiment, the support structure 520 may be fixed to the housing 510. The support structure 520 may include, for example, at least one fastener element 521 to enable fastening to the first cover 512. The fastener elements 521, as shown in FIGS. 5A-5B, may include, for example, a hole for threaded engagement. The fastener elements 521 may stably fix the first antenna 597A and the second antenna 597B in the housing 510. In some embodiments, the fastener elements 521 may be configured to receive a fastener therethrough that engages with a portion of the housing 510.

In an embodiment, the ground sheet 530 may be configured to disperse heat generated by the first antenna 597A and/or the second antenna 597B. For example, the ground sheet 530 may be directly or indirectly connected to the first cover 512 and may disperse the heat generated by the first antenna 597A and/or the second antenna 597B through the first cover 512.

In an embodiment, the electronic device 501 may include a conductive junction 536 configured to bond the ground sheet 530 and the first cover 512. The conductive junction 536 may be, for example, positioned between a portion (e.g., similar to the first sheet portion 330A shown in FIG. 3D) of the ground sheet 530 and the first inner surface 512B. The conductive junction 536 may include a first bonding surface (e.g., an upper bonding surface) bonded to the first inner surface 512B and a second bonding surface (e.g., a lower boding surface) attached or bonded to the portion of the ground sheet 530.

Referring to FIGS. 6A-6D, an electronic device 601 (e.g., similar the electronic devices 301, 401, 501 of FIGS. 3A-3D, 4A-4B, 5A-5B) may include a housing 610 including a cover 614 and a slot 616, a support structure 620, a first antenna 697A, and a second antenna 697B.

In an embodiment, the support structure 620 may include a metal bracket. For example, the support structure 620 may include a bracket formed from stainless use steel ("SUS"). The support structure 620 may be positioned between the first antenna 697A and the second antenna 697B. The support structure 620 may be configured to supply power to the second antenna 697B, ground a ground of the second antenna 697B by being electrically connected to the housing 610, and fix the first antenna 697A in the housing 610.

Figure 6A:
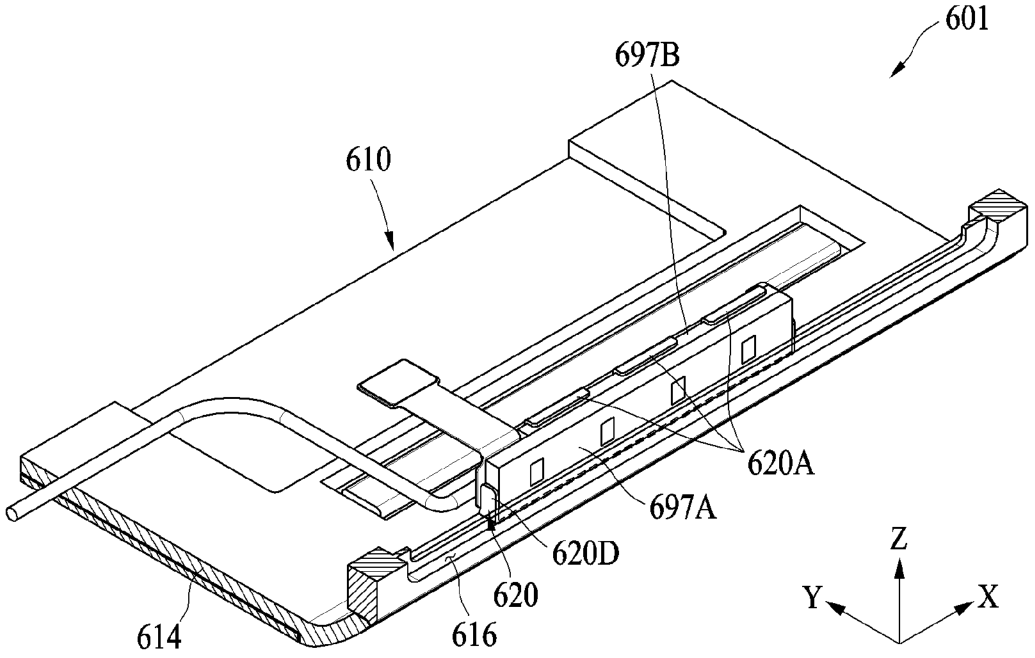
FIG. 6A is a perspective view illustrating a portion of a structure of an electronic device viewed in one direction according to an embodiment.
Figure 6B:
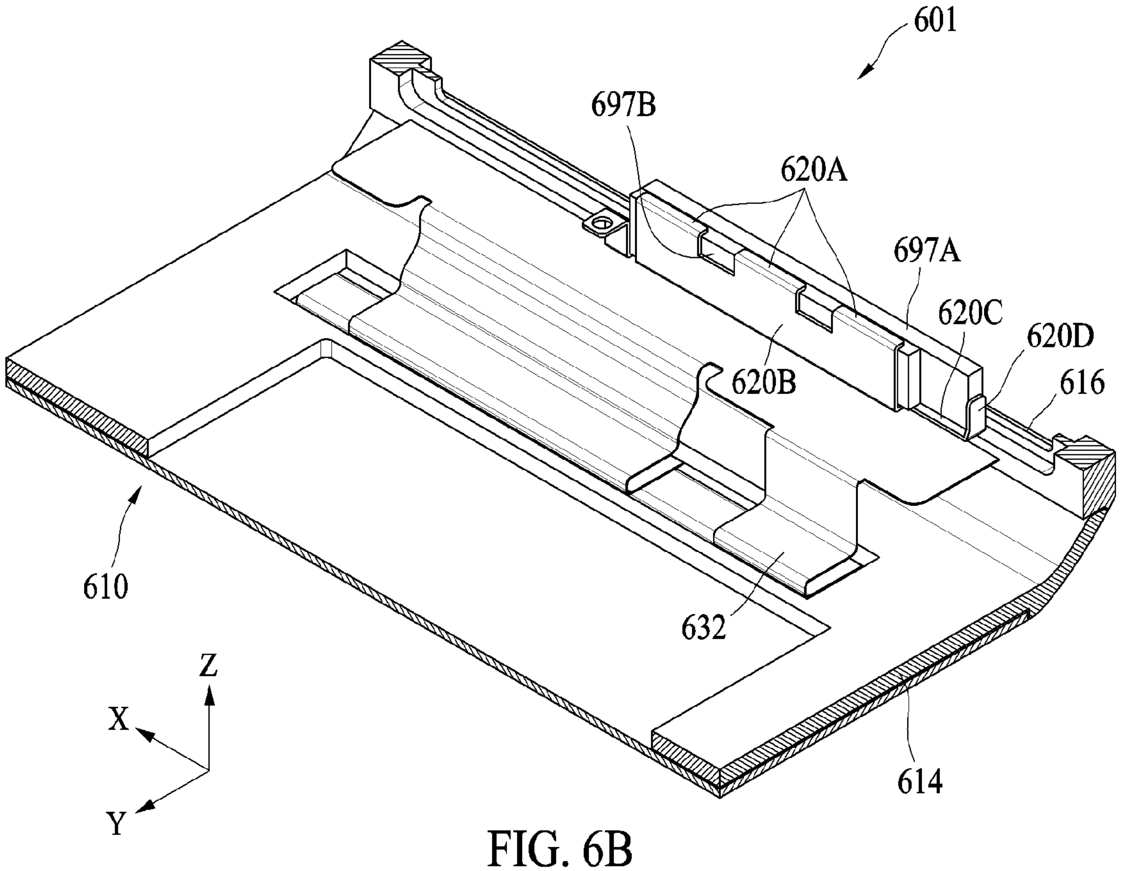
FIG. 6B is a perspective view illustrating the portion of the structure of the electronic device of FIG. 6A, viewed in another direction, according to an embodiment.

In an embodiment, and as shown in FIGS. 6A-6B, the support structure 620 may include one or more (e.g., three shown) of first enclosure portions 620A extending along a first inner surface (e.g., similar to the first inner surface 312B) and positioned on a first portion (e.g., an upper portion) of the first antenna 697A. The support structure 620 may include a second enclosure portion 620B connected to the first enclosure portions 620A and extending between the first inner surface and a second inner surface (e.g., similar to the second inner surface 314B) and positioned on a second portion (e.g., a first side) of the first antenna 697A. The support structure 620 may include a third enclosure portion 620C connected to the second enclosure portion 620B, extending along the second inner surface and positioned on a third portion (e.g., a lower portion) of the first antenna 697A.

In an embodiment, the first enclosure portions 620A, the second enclosure portion 620B, and the third enclosure portion 620C may be formed of a metal segment. In an embodiment, the first enclosure portions 620A, the second enclosure portion 620B, and the third enclosure portion 620C may be seamlessly formed as a substantially integral portion.

In some embodiments, the support structure 620 may include a plurality of first enclosure portions 620A spaced apart along the first antenna 697A on the first portion of the first antenna 697A.

In some embodiments, the support structure 620 may include a conductor portion 632 (e.g., similar to the conductor 332) electrically connected to the second cover 614.

Figure 6C:
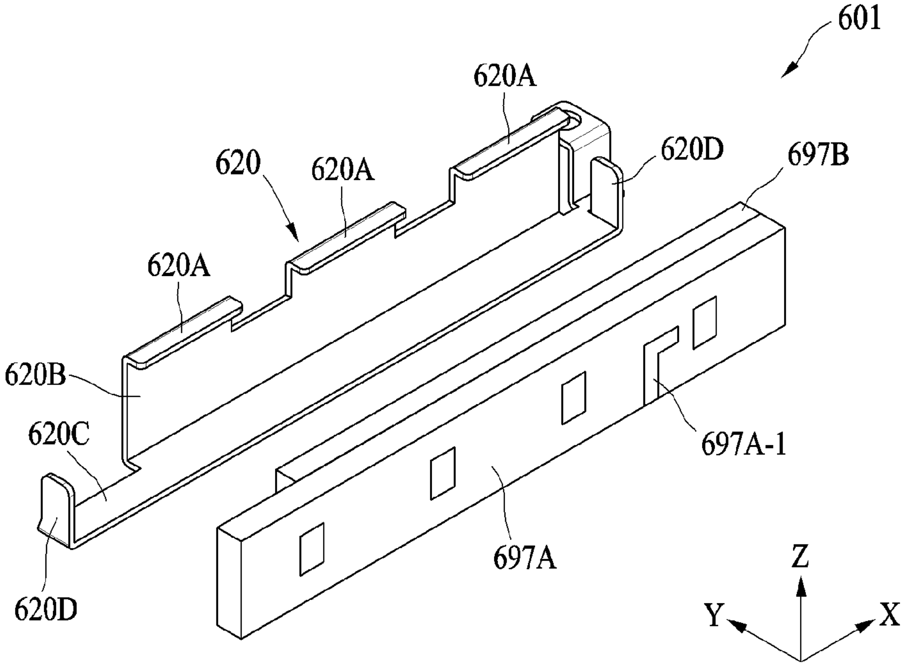
FIG. 6C is an exploded perspective view illustrating a coupling structure of an antenna in the electronic device of FIG. 6A, according to an embodiment.

In an embodiment, the support structure 620 may include a fourth enclosure portion 620D connected to the third enclosure portion 620C and positioned on a fourth portion (e.g., a second side) of the first antenna 697A. In some embodiments, the support structure 620 may include a pair of fourth enclosure portions 620D. For example, as shown in FIG. 6C, the support structure 620 includes two fourth enclosure portions 620D at opposite ends of the third enclosure portion 620C. In some embodiments, the fourth enclosure portion 620D may protrude from the third enclosure portion 620C and at least partially enclose the fourth portion of the first antenna 697A. In some embodiments, the fourth enclosure portion 620D may be connected to the third enclosure portion 620C and may not be directly connected to the first enclosure portions 620A and may not be directly connected to the second enclosure portion 620B.

Figure 6D:
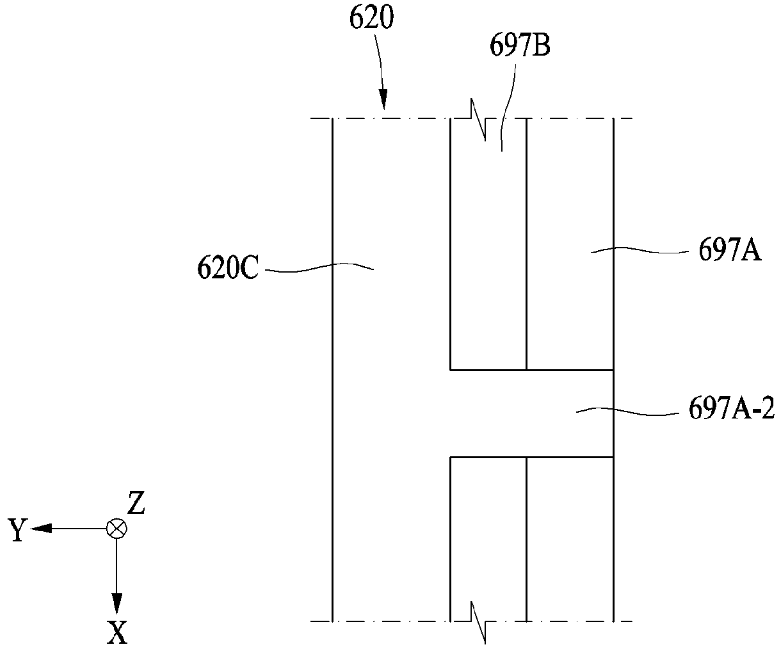
FIG. 6D is a view illustrating one surface (e.g., a lower surface) of an antenna and a support structure, which represents a connection structure of a conductive pattern of an antenna connected to a support structure according to an embodiment.

In an embodiment, the first antenna 697A may include a conductive pattern 697A-1 electrically connected to the support structure 620. For example, the conductive pattern 697A-1 may extend from the third enclosure portion 620C and may be at least partially overlapped on one surface (e.g., a front surface or a radiation surface) of the first antenna 697A without substantially obscuring a radiation portion of the first antenna 697A. The conductive pattern 697A-1 may form a stub pattern (e.g., similar to the first protrusion 412D) of the first antenna 697A. In an embodiment, the conductive pattern 697A-1 may include a conductive connecting member 697A-2 connected to the third enclosure portion 620C, extending from the third enclosure portion 620C, and positioned on one surface (e.g., a lower surface) of the first antenna 697A. Meanwhile, although FIG. 6C illustrates the conductive pattern 697A-1 such that it appears to be spaced apart from the support structure 620 to describe the support structure 620 coupled to the first antenna 697A, it may be understood that the conductive pattern 697A-2 is connected to the support structure 620 as illustrated in FIG. 6D.

Figure 7A:
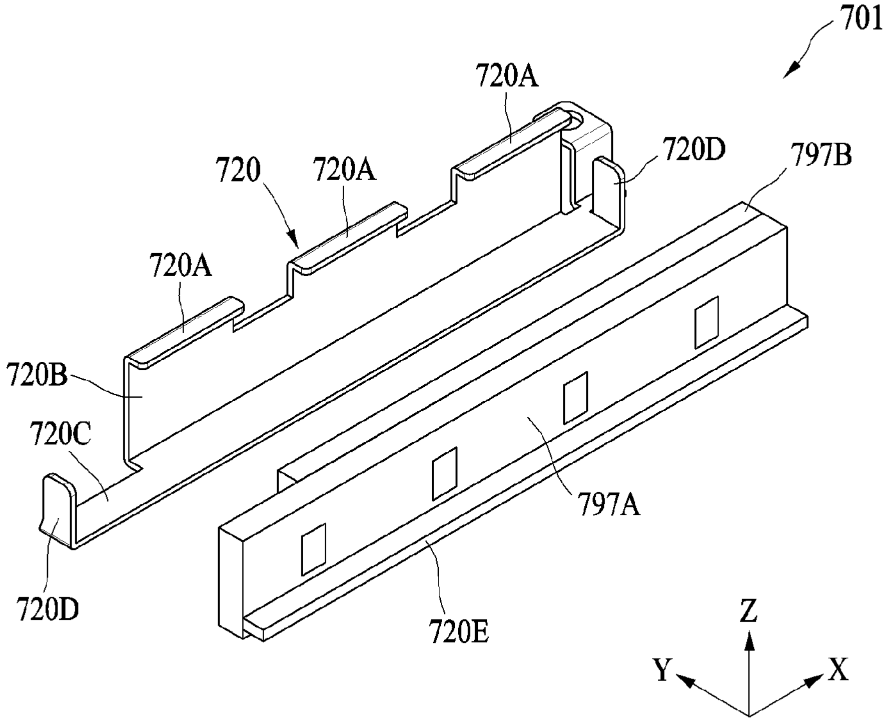
FIG. 7A is an exploded perspective view illustrating a coupling structure of an antenna in an electronic device according to an embodiment.
Figure 7B:
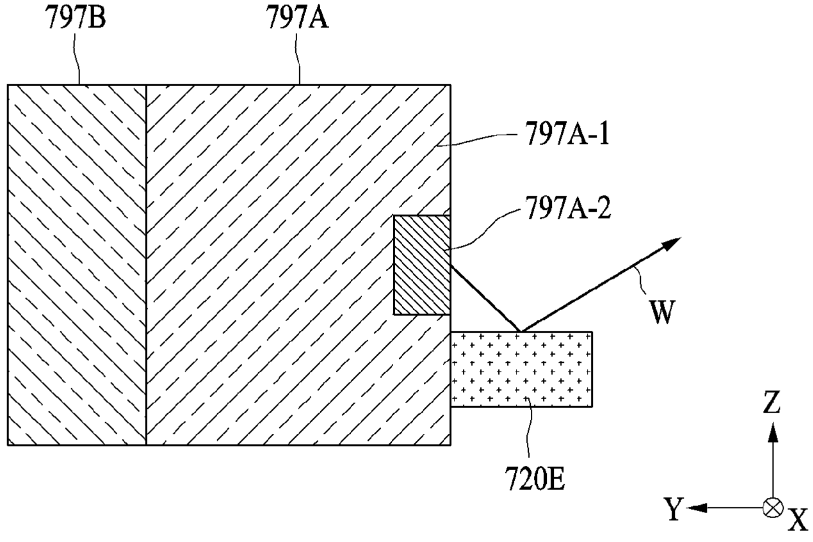
FIG. 7B is a view illustrating a cross-section of the antenna of FIG. 7A.

Referring to FIGS. 7A-7B, an electronic device 701 (e.g., similar to the electronic devices shown and described above) may include a support structure 720 supporting a first antenna 797A and/or a second antenna 797B, with the support structure 720 at least partially enclosing the first antenna 797A and/or the second antenna 797B. The support structure 720 may include one or more of first enclosure portions 720A, a second enclosure portion 720B, a third enclosure portion 720C, and a fourth enclosure portion 720D. The enclosure portions 720A, 720B, 720C, 720D may be similar to the enclosure portions 620A, 620B, 620C, 620D shown and described in FIGS. 6A-6D.

In an embodiment, the support structure 720 may include a reflector 720E positioned between the first antenna 797A and a slot of a housing (e.g., similar to the slot 616 shown in FIG. 6A). The reflector 720E may be configured to reflect a radio wave W radiated from a radiation portion 797A-2 formed in a carrier portion 797A-1 of the first antenna 797A. In an embodiment, the reflector 720E may be formed extending from the third enclosure portion 720C and/or the fourth enclosure portion 720D. In an embodiment, the reflector 720E may be formed across the first antenna 797A. For example, the reflector 720E may extend across a span, length, or width of the first antenna 797A, as shown in FIG. 7A. In some embodiments, the reflector 720E may extend along a length of the first antenna 797A (e.g., from a first end to a second end or direction along the slot or long dimension of the first antenna 797A). In an embodiment, the reflector 720E may extend from the carrier portion 797A-1 of the first antenna 797A toward or into the slot (e.g., the slot 616 of FIG. 6A). In an embodiment, the reflector 720E may be positioned between the radiation portion 797A-2 and a second inner surface (e.g., the second inner surface 314B of FIG. 3D).

An aspect of the disclosure may allow a plurality of antennas to be arranged in an electronic device in a way that is more efficient and reduces the possibility of needing to change the design of the electronic device.

According to an embodiment, an electronic device 301 may include a housing 310 including a first cover 312 including a first outer surface 312A, a first inner surface 312B opposite to the first outer surface 312A, and a first side surface 312C between the first outer surface 312A and the first inner surface 312B, a second cover 314 including a second outer surface 314A and a second inner surface 314B opposite to the second outer surface 314A and facing the first inner surface 312B, and a slot 316 positioned in the first side surface 312C, a first antenna 397A positioned between the first inner surface 312B and the second inner surface 314B, facing the slot 316, and configured to operate in a first frequency band, and a second antenna 397B positioned between the first inner surface 312B and the second inner surface 314B, facing the first antenna 397A, and configured to operate in a second frequency band different from the first frequency band.

In an embodiment, the electronic device 301 may further include a support structure 320 positioned between the first inner surface 312B and the second inner surface 314B, and configured to support the first antenna 397A and/or the second antenna 397B. For example, the support structure 320 may support the first antenna 397A. For example, the support structure 320 may support the second antenna 397B. For example, the support structure 320 may support the second antenna 397B, and the second antenna 397B may support the first antenna 397A. For example, the support structure 320 may support the first antenna 397A, and the first antenna 397A may support the second antenna 397B.

In an embodiment, the electronic device 301 may further include a ground sheet 330 at least partially enclosing the support structure 320 and connected to the second antenna 397B.

In an embodiment, the ground sheet 330 may include a first sheet portion 330A extending along the first inner surface 312B and positioned on the first surface of the support structure 320, a second sheet portion 330B extending between the first inner surface 312B and the second inner surface 314B and positioned a second surface connected to the first surface of the support structure 320, and a third sheet portion 330C extending along the second inner surface 314B and positioned on a third surface connected to the second surface of the support structure 320.

In an embodiment, the electronic device 301 may further include a conductor 332 connecting the second inner surface 314B to the ground sheet 330.

In an embodiment, the electronic device 501 may further include a conductive junction 536 bonding the first inner surface 512B and the ground sheet 530.

In an embodiment, the electronic device 301 may further include a slot cover 318 configured to at least partially cover the slot 316.

In an embodiment, the second antenna 497B may include a PCB 497B-1 including a feed pattern 497B-2.

In an embodiment, the first cover 412 may further include a protrusion 412D at least partially positioned on the second antenna 497B and protruding from the first inner surface 412B toward the second inner surface 414B.

In an embodiment, the electronic device 401 may further include a conductor 434 connecting the protrusion 412D to the second antenna 497B.

According to an embodiment, an electronic device 301, 601 may include a housing 310 including a first cover 312 including a first outer surface 312A, a first inner surface 312B opposite to the first outer surface 312A, and a first side surface 312C between the first outer surface 312A and the first inner surface 312B, a second cover 314 including a second outer surface 314A and a second inner surface 314B opposite to the second outer surface 314A and facing the first inner surface 312B, and a slot 316 positioned in the first side surface 312C, a first antenna 397A positioned between the first inner surface 312B and the second inner surface 314B, facing the slot 316, and configured to operate in a first frequency band, a second antenna 397B positioned between the first inner surface 312B and the second inner surface 314B, facing the first antenna 397A, and configured to operate in a second frequency band different from the first frequency band, and a support structure 320, 620 positioned between the first inner surface 312B and the second inner surface 314B and configured to support the first antenna 397A and/or the second antenna 397B.

In an embodiment, the support structure 620 may include first enclosure portions 620A extending along the first inner surface 312B and positioned on a first portion of the first antenna 697A, a second enclosure portion 620B connected to the first enclosure portions 620A, extending between the first inner surface 312B and the second inner surface 314B, and positioned on a second portion different from the first portion of the first antenna 697A, and a third enclosure portion 620C connected to the second enclosure portion 620B, extending along the second inner surface 314B, and positioned on a third portion opposite to the first portion and connected to the second portion of the first antenna 697A.

In an embodiment, the support structure 620 may further include a fourth enclosure portion 620D connected to the third enclosure portion 620C, extending between the first inner surface 312B and the second inner surface 314B, and at least partially enclosing the first antenna 697A.

In an embodiment, the support structure 620 may further include a conductor portion 632 connecting the second inner surface 314B to the third enclosure portion 620C.

In an embodiment, the first antenna 697A may include a conductive pattern 697A-1 electrically connected to the support structure 620.

According to an embodiment, an electronic device 301, 701 may include a housing 310 including a first cover 312 including a first outer surface 312A, a first inner surface 312B opposite to the first outer surface 312A, and a first side surface 312C between the first outer surface 312A and the first inner surface 312B, a second cover 314 including a second outer surface 314A and a second inner surface 314B opposite to the second outer surface 314A and facing the first inner surface 312B, and a slot 316 positioned in the first side surface 312C, a first antenna 397A, 797A positioned between the first inner surface 312B and the second inner surface 314B, facing the slot 316, and configured to operate in a first frequency band, a second antenna 397B positioned between the first inner surface 312B and the second inner surface 314B, facing the first antenna 397A, 797A, and configured to operate in a second frequency band different from the first frequency band, and a support structure 720 positioned between the first inner surface 312B and the second inner surface 314B, configured to support the first antenna 397A, 797A and the second antenna 397B, and including a reflector 720E positioned between the first antenna 397A, 797A and the slot 316.

In an embodiment, the reflector 720E may be formed across the first antenna 397A, 797A.

In an embodiment, the reflector 720E may extend from the first antenna 397A, 797A toward the slot 316.

In an embodiment, the support structure 720 may further include an enclosure portion 720B, 720D connected to the reflector 720E, extending between the first inner surface 312B and the second inner surface 314B, and at least partially enclosing the first antenna 397A, 797A.

In an embodiment, the first antenna 397A, 797A may include a radiation portion 797A-2, and the reflector 720E may be positioned between the radiation portion 797A-2 and the second inner surface 314B.

According to an embodiment, an electronic device comprises a housing having a top portion, a bottom portion, and a side portion, wherein the side portion comprises a slot, a first antenna positioned in the housing proximate the slot, the first antenna configured to operate in a first frequency band, and a second antenna positioned in the housing and positioned adjacent the first antenna such that the first antenna is arranged between the second antenna and the slot, the second antenna configured to operate in a second frequency band different from the first frequency band.

In an embodiment, the electronic device comprises a support structure positioned in the housing adjacent the second antenna, such that the second antenna is arranged between the support structure and the first antenna.

According to an embodiment, it may be possible to arrange a plurality of antennas in an electronic device more efficiently while reducing the possibility of needing to change the design of the electronic device. The effects of the electronic device according to an embodiment are not limited to the above-mentioned effects, and other unmentioned effects can be clearly understood from the following description by one of ordinary skill in the art.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:

a housing comprising:

a first cover comprising a first outer surface, a first inner surface opposite to the first outer surface, and a first side surface between the first outer surface and the first inner surface;

a second cover comprising a second outer surface and a second inner surface opposite to the second outer surface and facing the first inner surface; and a slot positioned extending between the first inner surface of the first cover and the second inner surface of the second cover;

a first antenna module positioned in the housing between the first inner surface and the second inner surface and facing the slot, the first antenna module configured to operate in a first frequency band, wherein the first frequency band is a mmWave band;

a second antenna module positioned in the housing between the first inner surface and the second inner surface and facing the first antenna module, the second antenna module configured to operate in a second frequency band different from the first frequency band, wherein the second frequency band is a band except for the mm Wave band, wherein the first antenna module is arranged directly adjacent to the slot and directly adjacent to the second antenna module such that the first antenna module is disposed directly between the slot and the second antenna module.

2. The electronic device of claim 1, further comprising:

a slot cover configured to at least partially cover the slot.

3. The electronic device of claim 1, wherein the second antenna module comprises a printed circuit board (PCB) comprising a feed pattern.

4. The electronic device of claim 1, wherein the first cover further comprises:

a protrusion at least partially positioned on the first antenna module and protruding from the first inner surface toward the second inner surface.

5. The electronic device of claim 4, further comprising:

a conductor configured to connect the protrusion to the second antenna module.

6. The electronic device of claim 1, further comprising:

a support structure positioned between the first inner surface and the second inner surface, the support structure configured to support at least one of the first antenna module or the second antenna module; and a ground sheet at least partially enclosing the support structure and connected to the second antenna module.

7. The electronic device of claim 6, wherein the ground sheet comprises:

a first sheet portion extending along the first inner surface and positioned on a first surface of the support structure;

a second sheet portion extending between the first inner surface and the second inner surface and positioned on a second surface of the support structure; and a third sheet portion extending along the second inner surface and positioned on a third surface of the support structure.

8. The electronic device of claim 6, further comprising:

a conductor configured to connect the second inner surface to the ground sheet.

9. The electronic device of claim 6, further comprising:

a conductive junction configured to bond the first inner surface and the ground sheet.

10. An electronic device, comprising:

a housing comprising:

a first cover comprising a first outer surface, a first inner surface opposite to the first outer surface, and a first side surface between the first outer surface and the first inner surface;

a second cover comprising a second outer surface and a second inner surface opposite to the second outer surface and facing the first inner surface; and a slot positioned extending between the first inner surface of the first cover and the second inner surface of the second cover;

a first antenna module positioned in the housing between the first inner surface and the second inner surface and facing the slot, the first antenna module configured to operate in a first frequency band, wherein the first frequency band is a mmWave band;

a second antenna module positioned in the housing between the first inner surface and the second inner surface and facing the first antenna module, the second antenna module configured to operate in a second frequency band different from the first frequency band, wherein the second frequency band is a band except for the mmWave band;

a support structure, positioned between the first inner surface and the second inner surface, configured to support at least one of the first antenna module or the second antenna module; and a ground sheet at least partially enclosing the support structure and connected to the second antenna module, wherein the support structure comprises a metal bracket, and wherein the first antenna module is arranged directly adjacent to the slot and directly adjacent to the second antenna module such that the first antenna module is disposed directly between the slot and the second antenna module.

11. The electronic device of claim 10, wherein the support structure comprises:

a first enclosure portion extending along the first inner surface and positioned on a first portion of the first antenna module;

a second enclosure portion connected to the first enclosure portion, extending between the first inner surface and the second inner surface, and positioned on a second portion of the first antenna module different from the first portion; and a third enclosure portion connected to the second enclosure portion, extending along the second inner surface, and positioned on a third portion of the first antenna module opposite to the first portion and connected to the second portion.

12. The electronic device of claim 11, wherein the support structure further comprises:

a fourth enclosure portion connected to the third enclosure portion, extending between the first inner surface and the second inner surface, and at least partially enclosing the first antenna module.

13. The electronic device of claim 11, wherein the support structure further comprises:

a conductor portion connecting the second inner surface to the third enclosure portion.

14. The electronic device of claim 10, wherein the first antenna module comprises a conductive pattern electrically connected to the support structure.

* * * * *